US010943472B2

(12) United States Patent
Morimura et al.

(10) Patent No.: US 10,943,472 B2
(45) Date of Patent: Mar. 9, 2021

(54) NOTIFICATION DEVICE

(71) Applicant: Toyota Jidosha Kabushiki Kaisha, Toyota (JP)

(72) Inventors: Junichi Morimura, Shizuoka (JP); Tomoyuki Kuriyama, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/681,199

(22) Filed: Nov. 12, 2019

(65) Prior Publication Data

US 2020/0152051 A1 May 14, 2020

(30) Foreign Application Priority Data

Nov. 14, 2018 (JP) .............................. JP2018-213892

(51) Int. Cl.
*G08G 1/005* (2006.01)
*B60Q 1/50* (2006.01)
*B60R 11/00* (2006.01)
*B60R 11/02* (2006.01)

(52) U.S. Cl.
CPC ............ *G08G 1/005* (2013.01); *B60Q 1/503* (2013.01); *B60R 11/0223* (2013.01); *B60R 2011/004* (2013.01)

(58) Field of Classification Search
None
See application file for complete search history.

(56) References Cited

U.S. PATENT DOCUMENTS

| 8,954,252 | B1* | 2/2015 | Urmson | G08G 1/167 |
| | | | | 701/70 |
| 9,196,164 | B1 | 11/2015 | Urmson et al. | |
| 9,654,738 | B1* | 5/2017 | Ferguson | G06K 9/00805 |
| 9,902,311 | B2* | 2/2018 | Sweeney | B60Q 5/005 |
| 10,121,368 | B1* | 11/2018 | Aladas | G08G 1/07 |
| 10,261,513 | B2* | 4/2019 | Reiley | B60Q 5/006 |
| 10,706,719 | B2* | 7/2020 | Zhang | G08G 1/095 |
| 2007/0229238 | A1* | 10/2007 | Boyles | G06K 9/00369 |
| | | | | 340/435 |
| 2008/0042878 | A1* | 2/2008 | Heng | G08G 1/161 |
| | | | | 340/936 |
| 2011/0128161 | A1* | 6/2011 | Bae | B60Q 5/006 |
| | | | | 340/901 |
| 2013/0038712 | A1* | 2/2013 | Valaix | B60K 35/00 |
| | | | | 348/77 |

(Continued)

FOREIGN PATENT DOCUMENTS

JP 2015-072570 A 4/2015

*Primary Examiner* — Fekadeselassie Girma
(74) *Attorney, Agent, or Firm* — Dinsmore & Shohl LLP

(57) ABSTRACT

A notification device provided in a vehicle and configured to notify pedestrians of information includes a recognition unit configured to recognize, based on a result of detection performed by an external sensor, a plurality of pedestrians, a notification unit configured to perform notification about the information with respect to an outside of the vehicle, and a notification controller configured to generate the information, about which the notification unit performs notification, for each pedestrian in response to recognizing the plurality of pedestrians by the recognition unit and to cause the notification unit to perform notification about the generated information for each pedestrian.

9 Claims, 10 Drawing Sheets

(56) References Cited

U.S. PATENT DOCUMENTS

| | | | |
|---|---|---|---|
| 2015/0094878 A1* | 4/2015 | Miura | B60W 50/14 |
| | | | 701/1 |
| 2016/0272215 A1* | 9/2016 | Laine | G08G 1/166 |
| 2018/0114435 A1* | 4/2018 | Singh | G06F 3/0481 |
| 2018/0118109 A1* | 5/2018 | Fujisawa | B62D 15/0255 |
| 2018/0205457 A1* | 7/2018 | Scheim | H04B 10/40 |
| 2019/0018240 A1* | 1/2019 | Kasazumi | G02B 27/01 |
| 2019/0019045 A1* | 1/2019 | Ogura | G06K 9/4604 |
| 2019/0027028 A1* | 1/2019 | Fields | G08G 1/162 |
| 2019/0130874 A1* | 5/2019 | Wafford | B60Q 1/50 |
| 2019/0266644 A1* | 8/2019 | Cho | H04W 4/44 |
| 2020/0047668 A1* | 2/2020 | Ueno | B60Q 9/008 |
| 2020/0215968 A1* | 7/2020 | Chou | B60R 16/03 |

\* cited by examiner

NOTIFICATION DEVICE

CROSS-REFERENCE TO RELATED APPLICATION

This application claims priority to Japanese Patent Application No. 2018-213892 filed with Japan Patent Office on Nov. 14, 2018, the entire contents of which are hereby incorporated by reference.

TECHNICAL FIELD

The present disclosure relates to a notification device.

BACKGROUND

U.S. Pat. No. 9,196,164 discloses a vehicle performing autonomous driving. When a determination is made that a pedestrian may cross the trajectory of the vehicle, the vehicle notifies the pedestrian of a current or future behavior of the host vehicle by using a language, light, a sound, or the like.

SUMMARY

When there is a plurality of pedestrians in the vicinity of a vehicle, the pedestrians may not be present at the same position and act in the same way. Therefore, when all of the plurality of pedestrians is notified of uniform information, an action taken by some pedestrian and the contents of the information may not match each other and thus there is a possibility that some pedestrian misunderstands or is confused.

The present disclosure provides a notification device that can perform notification without confusing a plurality of pedestrians.

An aspect of the present disclosure relates to a notification device provided in a vehicle and configured to notify pedestrians of information. The notification device includes a recognition unit, a notification unit, and a notification controller. The recognition unit is configured to recognize, based on a result of detection performed by an external sensor, a plurality of pedestrians. The notification unit is configured to perform notification about the information with respect to an outside of the vehicle. The notification controller is configured to generate the information, about which the notification unit performs notification, for each pedestrian in response to recognizing the plurality of pedestrians by the recognition unit and to cause the notification unit to perform notification about the generated information for each pedestrian.

In the case of the notification device, when the external sensor detects a plurality of pedestrians, information for each pedestrian is generated and notification about the generated information for each pedestrian is performed. For this reason, in comparison with a case where all of the plurality of pedestrians is notified of uniform information, it is possible to perform notification of which the contents match an action taken by each pedestrian. For this reason, with the notification device, it is possible to perform notification without confusing the plurality of pedestrians in comparison with a case where all of the plurality of pedestrians is notified of uniform information.

In the notification device according to the aspect of the disclosure, the notification unit may be provided with a plurality of display regions with which information is displayed to the outside of the vehicle and the notification controller may be configured to associate the plurality of display regions with the plurality of pedestrians and to cause the information to be displayed on each of the associated display regions. In this case, the notification device also can perform notification about an association relationship between information about which notification is performed and a notification target pedestrian.

Another aspect of the present disclosure relates to a notification device provided in a vehicle and configured to notify pedestrians of information. The notification device includes a recognition unit, a notification unit, and a notification controller. The recognition unit is configured to recognize, based on a result of detection performed by an external sensor, a plurality of pedestrians. The notification unit is configured to perform notification about the information with respect to an outside of the vehicle. The notification controller is configured to group the plurality of pedestrians into at least one group based on pedestrian-to-pedestrian distances of the plurality of pedestrians in response to recognizing the plurality of pedestrians by the recognition unit, to generate the information, about which the notification unit performs notification, for each group, and to cause the notification unit to perform notification about the generated information for each group.

In the case of the notification device, when the external sensor detects a plurality of pedestrians, the plurality of pedestrians is grouped based on the pedestrian-to-pedestrian distances, information for each group is generated, and notification about the generated information for each group is performed. For this reason, with the notification device, it is possible to perform notification without confusing the plurality of pedestrians in comparison with a case where all of the plurality of the pedestrians is notified of uniform information and it is possible to prevent notification about the same information from being performed a plurality of times in comparison with a case where notification about information for each pedestrian is performed.

In the notification device according to the other aspect of the disclosure, the notification controller may be configured to group the plurality of pedestrians into at least one group based on the pedestrian-to-pedestrian distances of the plurality of pedestrians and at least one of a speed, a body orientation, and a proceeding direction of the plurality of pedestrians. In this case, the notification device can accurately group pedestrians acting similarly.

In the notification device according to the other aspect of the disclosure, the notification unit may be provided with a plurality of display regions with which information is displayed to the outside of the vehicle, and the notification controller may be configured to associate the plurality of display regions with the at least one group and to cause the information to be displayed on each of the associated display regions. In this case, the notification device also can perform notification about an association relationship between information about which notification is performed and a notification target group.

According to various aspects and embodiments of the present disclosure, it is possible to perform notification without confusing a plurality of pedestrians.

DETAILED DESCRIPTION

Figure 1:
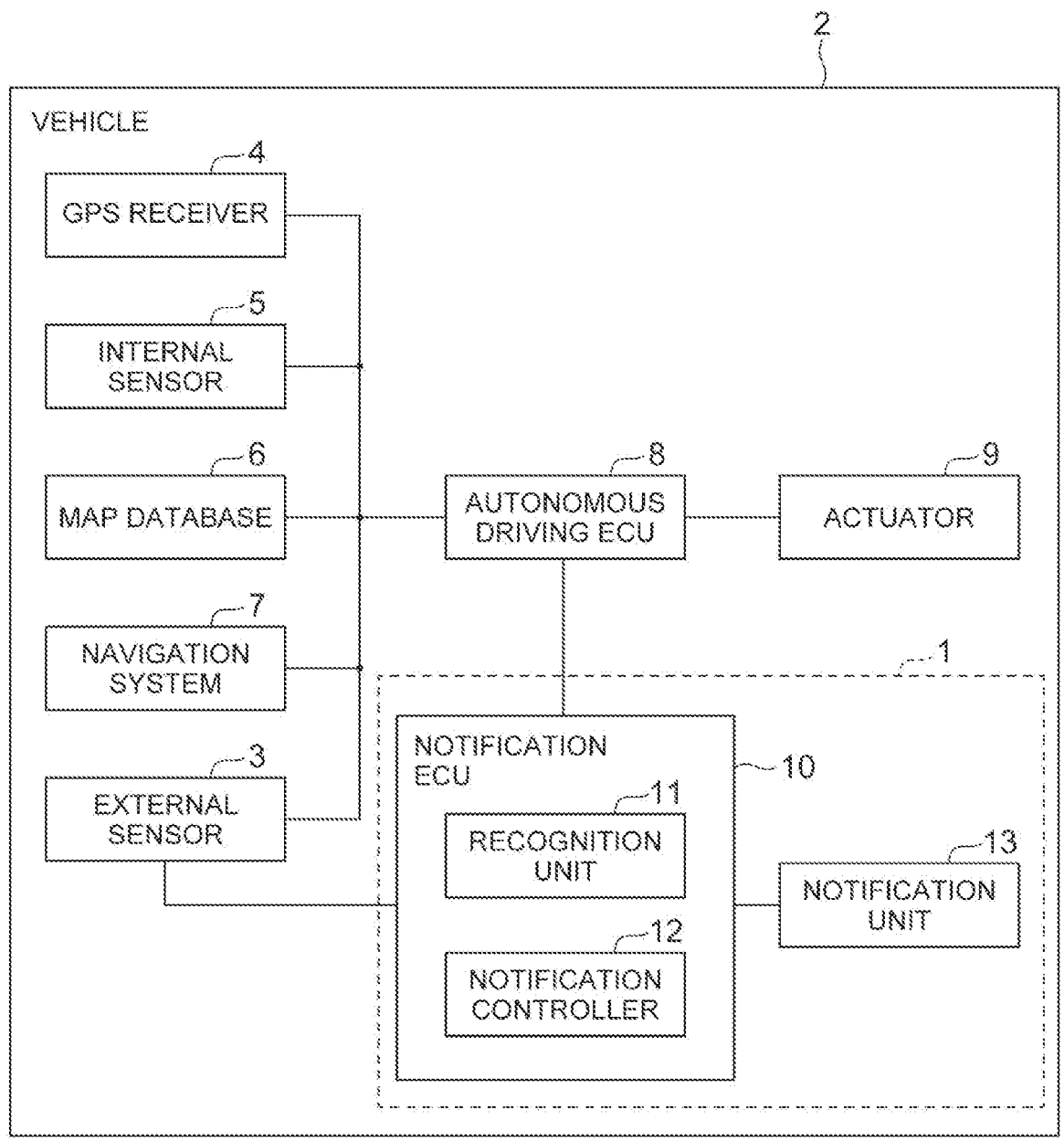
FIG. 1 is a functional block diagram of an example of a vehicle including a notification device according to the embodiment.

Hereinafter, an exemplary embodiment will be described with reference to drawings. In the following description, the same or corresponding elements are given the same reference numerals and repetitive description will be omitted.

First Embodiment

Configuration of Vehicle and Notification Device

FIG. 1 is a functional block diagram of an example of a vehicle 2 including a notification device 1 according to a first embodiment. As illustrated in FIG. 1, in the vehicle 2 such as a passenger car, the notification device 1 is installed such that a pedestrian is notified of information. The vehicle 2 is, for example, a vehicle that travels while performing autonomous driving. Autonomous driving is vehicle control that causes the vehicle 2 to automatically travel to a destination set in advance. The destination may be set by an occupant such as a driver and may be automatically set by the vehicle 2. At the time of the autonomous driving, the driver does not need to perform a driving operation and the vehicle 2 travels automatically.

The vehicle 2 is provided with an external sensor 3, a GPS receiver 4, an internal sensor 5, a map database 6, a navigation system 7, an autonomous driving ECU 8, and an actuator 9.

The external sensor 3 is a detecting machine that detects a situation in the vicinity of the vehicle 2. The external sensor 3 detects the position of an object in front of a roadway on which the vehicle 2 travels. The external sensor 3 includes at least one of a camera and a radar sensor.

The camera is an imaging machine that images a situation outside the vehicle 2. The camera is provided on a rear side of a windshield of the vehicle 2, for example. The camera acquires imaging information related to the situation outside the vehicle 2. The camera may be a monocular camera and may be a stereo camera. The stereo camera includes two imaging units that are disposed such that binocular parallax is realized. Imaging information of the stereo camera includes information in a depth direction also.

The radar sensor is a detecting machine that detects an object in the vicinity of the vehicle 2 by using a radio wave (for example, millimeter wave) or light. Examples of the radar sensor include a millimeter wave radar and a laser imaging detection and ranging (LIDAR). The radar sensor detects an object by transmitting a radio wave or light to the vicinity of the vehicle 2 and receiving the radio wave or light reflected by the object.

The GPS receiver 4 acquires position information indicating the position of the vehicle 2 by receiving signals from three or more GPS satellites. The position information includes latitude and longitude, for example. Instead of the GPS receiver 4, other means capable of specifying the latitude and the longitude of the vehicle 2 may also be used.

The internal sensor 5 is a detecting machine that detects a traveling state of the vehicle 2. The internal sensor 5 includes a vehicle speed sensor, an acceleration sensor, and a yaw rate sensor. The vehicle speed sensor is a measurer that measures the speed of the vehicle 2. As the vehicle speed sensor, for example, a vehicle wheel speed sensor that is provided with respect to vehicle wheels of the vehicle 2 or a drive shaft integrally rotating with the vehicle wheels and that measures the rotation speed of vehicle wheels is used.

The acceleration sensor is a measurer that measures the degree of acceleration of the vehicle 2. The acceleration sensor may include a front-rear acceleration sensor that measures the degree of acceleration of the vehicle 2 in a front-rear direction and a lateral acceleration sensor that measures the degree of acceleration of the vehicle 2. The yaw rate sensor is a measurer that measures the yaw rate (rotary angular speed) around the vertical axis of the center of gravity of the vehicle 2. As the yaw rate sensor, a gyro sensor can be used, for example.

The map database 6 is a storing device that stores map information. The map database 6 is stored in a hard disk drive (HDD) installed in the vehicle 2, for example. The map database 6 includes information of a stationary object, traffic rules, and the positions of traffic lights. The stationary object is, for example, a road surface painting (including lane boundary line such as white line and yellow line) and a structure (such as curb, pole, electric pole, building, sign, and tree). A part of the map information included in the map database 6 may be stored in a storing device different from the HDD in which the map database 6 is stored. A part of or the entire map information included in the map database 6 may be stored in a storing device other than a storing device provided in the vehicle 2.

The navigation system 7 is a system that guides a driver of the vehicle 2 to a destination set in advance. The navigation system 7 recognizes, based on the position of the vehicle 2 measured by the GPS receiver 4 and the map information in the map database 6, a traveling road and a traveling lane on which the vehicle 2 travels. The navigation system 7 calculates a target route from the position of the vehicle 2 to the destination and guides the driver along the target route by using a human machine interface (HMI).

The actuator 9 is a device that performs traveling control of the vehicle 2. The actuator 9 includes at least an engine actuator, a brake actuator, and a steering actuator. The engine actuator controls the drive force of the vehicle 2 by changing the amount of air supplied to an engine (for example, changing throttle opening degree) in accordance with a control signal from the autonomous driving ECU 8. The engine actuator controls the drive force of a motor functioning as a power source when the vehicle 2 is a hybrid vehicle or an electric vehicle.

The autonomous driving ECU 8 controls the vehicle 2. The ECU is an electronic control unit that includes a central processing unit (CPU), a read only memory (ROM), a random access memory (RAM), a controller area network (CAN) communication circuit, or the like. The autonomous driving ECU 8 is connected to a network in which communication is performed by means of the CAN communication circuit and is connected to the above-described constituent elements of the vehicle 2 such that the autonomous driving ECU 8 can communicate with the constituent elements. The autonomous driving ECU 8 realizes an autonomous driving function by operating the CAN communication circuit such that data is input and output, storing the data in the RAM, loading a program stored in the ROM into the RAM, and executing the program loaded into the RAM, based on a signal output by the CPU, for example. The autonomous driving ECU 8 may include a plurality of electronic control units.

The autonomous driving ECU 8 recognizes an object (including position of object) in the vicinity of the vehicle 2 based on at least one of the result of detection performed by the external sensor 3 and the map database 6. Examples of the object include a dynamic object such as a pedestrian, a bicycle, and a non-host vehicle in addition to a stationary object such as an electric pole, a guardrail, a tree, and a building. The autonomous driving ECU 8 performs object recognition each time the result of detection is acquired from the external sensor 3, for example. The autonomous driving ECU 8 may recognize an object by using other known methods.

The autonomous driving ECU 8 detects a dynamic object from recognized objects by using the information of a stationary object included in the map database 6, for example. The autonomous driving ECU 8 may detect the dynamic objects by using other known methods.

The autonomous driving ECU 8 measures the movement quantity of the dynamic object at that time by applying a Kalman filter a particle filter, or the like with respect to the detected dynamic object. The movement quantity includes the movement direction and the movement speed of the dynamic object. The movement quantity may include the rotation speed of the dynamic object. In addition, the autonomous driving ECU 8 may perform movement quantity error estimation.

The autonomous driving ECU 8 recognizes the traveling state of the vehicle 2 based on the result of detection performed by the internal sensor 5 (for example, vehicle speed information of vehicle speed sensor, acceleration information of acceleration sensor, yaw rate information of yaw rate sensor, or like). The traveling state of the vehicle 2 includes, for example, the vehicle speed, the degree of acceleration, and the yaw rate.

The autonomous driving ECU 8 recognizes, based on the result of detection performed by the external sensor 3, boundary lines of a lane on which the vehicle 2 travels.

The autonomous driving ECU 8 generates the course of the vehicle 2 based on the result of detection performed by the external sensor 3, the map database 6, the recognized position of the vehicle 2 in a map, information about a recognized object (including lane boundary lines), and the recognized traveling state of the vehicle 2. At this time, the autonomous driving ECU 8 generates the course of the vehicle 2 while making an assumption about the behavior of an object in the vicinity of the vehicle 2. Examples of the assumption about the behavior of the object include an assumption that all of objects in the vicinity of the vehicle 2 are stationary objects, an assumption that a dynamic object moves independently, and an assumption that a dynamic object moves while interacting with at least one of another object and the vehicle 2.

The autonomous driving ECU 8 generates a plurality of candidates for the course of the vehicle 2 by using a plurality of assumptions. The candidates for the course include at least one course along which the vehicle 2 travels avoiding an object. The autonomous driving ECU 8 selects one course by using the reliabilities of the candidates for the course or the like.

The autonomous driving ECU 8 generates a traveling plan in accordance with the selected course. The autonomous driving ECU 8 generates the traveling plan in accordance with the course of the vehicle 2 based on the result of detection performed by the external sensor 3 and the map database 6. The autonomous driving ECU 8 generates the traveling plan such that the speed limit for a traveling lane is not exceeded by using the speed limit stored in the map database 6. In addition, the autonomous driving ECU 8 generates the traveling plan in which the vehicle 2 travels such that a predetermined upper limit speed is not exceeded.

The autonomous driving ECU 8 outputs the traveling plan to be generated such that the course of the vehicle 2 has a plurality of combinations of two elements, the two elements being a target position p in a coordinate system fixed to the vehicle 2 and a speed V at each target point (that is, plurality of configuration coordinates (p, V)). Here, each target position p includes at least the X and Y coordinates thereof in the coordinate system fixed to the vehicle 2 or information equivalent thereto. Note that, the traveling plan is not particularly limited as long as the traveling plan described the behavior of the vehicle 2. Regarding the traveling plan, a target time t may be used instead of the speed V and the target time t and the orientation of the vehicle 2 at that time may be added to the traveling plan. The traveling plan may be data indicating how the vehicle speed, the degree of acceleration and deceleration, the steering torque, and the like of the vehicle 2 change when the vehicle 2 travels along the course. The traveling plan may include the speed pattern, the pattern of the degree of acceleration and deceleration, and the steering pattern of the vehicle 2.

The autonomous driving ECU 8 automatically controls travel of the vehicle 2 based on the generated traveling plan. The autonomous driving ECU 8 outputs a control signal corresponding to the traveling plan to the actuator 9. In this manner, the autonomous driving ECU 8 controls travel of the vehicle 2 such that the vehicle 2 automatically travels in accordance with the traveling plan.

The notification device 1 is provided with a notification ECU 10 and a notification unit 13. The notification ECU 10 is an electronic control unit that controls notification of information with respect to a pedestrian. The notification ECU 10 may include a plurality of ECUs. The notification unit 13 is a machine that is provided in the vehicle 2 and that performs notification of information with respect to the outside of the vehicle. The notification unit 13 is connected to the notification ECU 10 and performs notification about information based on an output signal of the notification ECU 10.

The information about which the notification unit 13 performs notification is information which a pedestrian present in the vicinity of the vehicle 2 is to be notified of. The information may be a result obtained by using the external sensor 3 such as detection information or recognition information of the vehicle 2. The information may be a result obtained by using the internal sensor 5 such as speed information or acceleration information of the vehicle 2. Alternatively, the information may be information acquired from the autonomous driving ECU 8 such as a current or future behavior of the vehicle 2. In the following description, the information about which notification is performed is the result of pedestrian recognition including the position and movement of a pedestrian. However, the information is not limited thereto.

Figure 2:
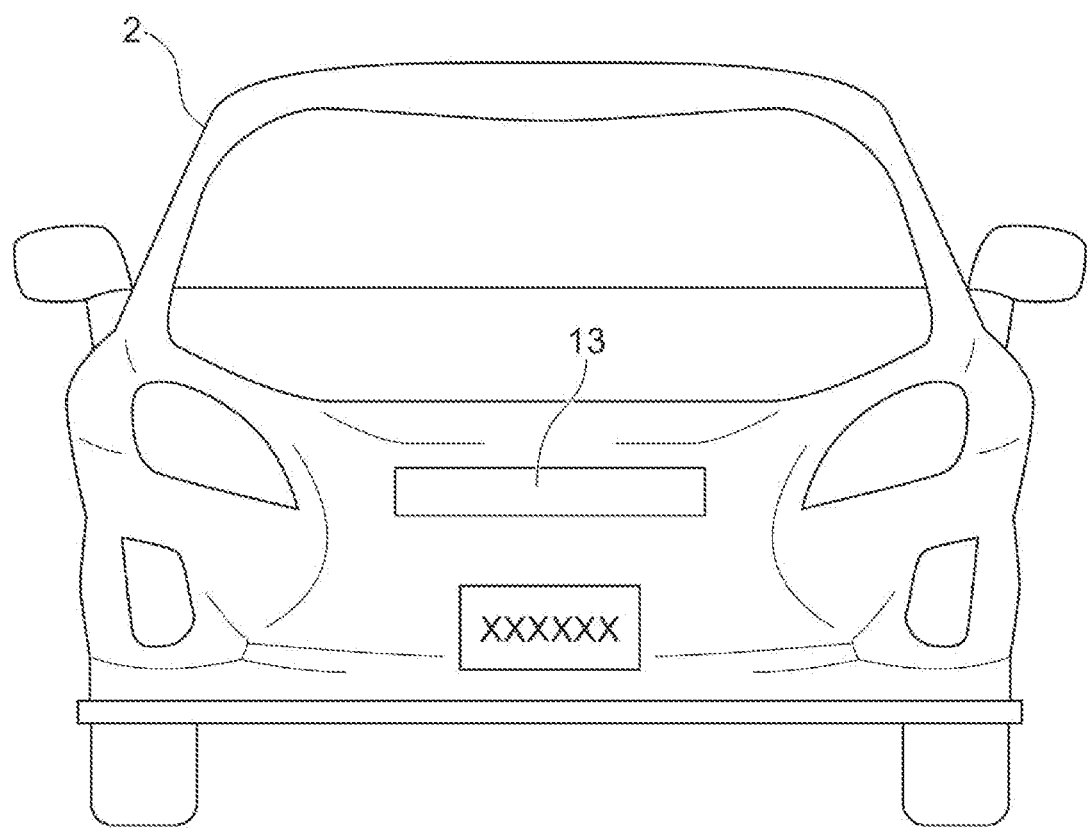
FIG. 2 a view illustrating an example of an in-vehicle installation position of a notification unit.

The notification unit 13 is, for example, a display device. The notification unit 13 is disposed at a position such that the notification unit 13 can be visually recognized from a position in front of the vehicle 2. FIG. 2 is a view illustrating an example of an in-vehicle installation position of the notification unit. As shown in FIG. 2, one display device is provided in a grille portion on the front side of the vehicle 2, as the notification unit 13. The notification unit 13 is not limited to that as in the example shown in FIG. 2. A plurality of display devices may be provided in the grille portion on the front side of the vehicle 2 and may be provided in a rear portion of the vehicle 2.

The notification unit 13 may be provided with a plurality of display regions with which information is displayed to the outside of the vehicle. The display regions are regions logically defined in one display screen. The notification unit 13 may dynamically increase the number of display regions based on a signal from the notification ECU 10. Note that, when the notification unit 13 includes a plurality of display devices, the entire part of one display screen may be used as one display region.

The notification ECU 10 is provided with a recognition unit 11 and a notification controller 12.

The recognition unit 11 recognizes a plurality of pedestrians based on the result of detection performed by the external sensor 3. The recognition unit 11 determines whether a plurality of objects detected by the external sensor 3 is a plurality of pedestrians or not by using a pattern matching technique or the like. The recognition unit 11 recognizes a plurality of pedestrians who can visually recognize the notification unit 13. For example, when the notification unit 13 is provided in the grille portion on the front side of the vehicle 2, a plurality of pedestrians present in front of the vehicle 2 are recognized. For example, when the notification unit 13 is provided in the rear portion of the vehicle 2, a plurality of pedestrians present behind the vehicle 2 are recognized. The recognition unit 11 recognizes the positions and movements of the pedestrians based on the result of detection performed by the external sensor 3.

The recognition unit 11 may select a plurality of notification target pedestrians from the plurality of pedestrians. For example, the recognition unit 11 may exclude, from the notification targets, a pedestrian who moves in the same direction as the vehicle 2 at a position outside a roadway on which the vehicle 2 travels. Since the recognition unit 11 selects the notification targets, unnecessary notification is suppressed and thus it is possible to accurately provide information to a plurality of pedestrians who needs to be notified of the information.

In response to recognizing the plurality of pedestrians by the recognition unit 11, the notification controller 12 generates information, about which the notification unit 13 performs notification, for each pedestrian and causes the notification unit 13 to perform notification about the generated information for each pedestrian. For example, the notification controller 12 generates, based on the positions and movements of the pedestrians recognized by the recognition unit 11, object information indicating the position and movement of the pedestrian for each pedestrian. The notification controller 12 causes the notification unit 13 to perform notification about the generated object information. Accordingly, each pedestrian is notified of how the pedestrians are recognized by the vehicle 2.

Figure 3:
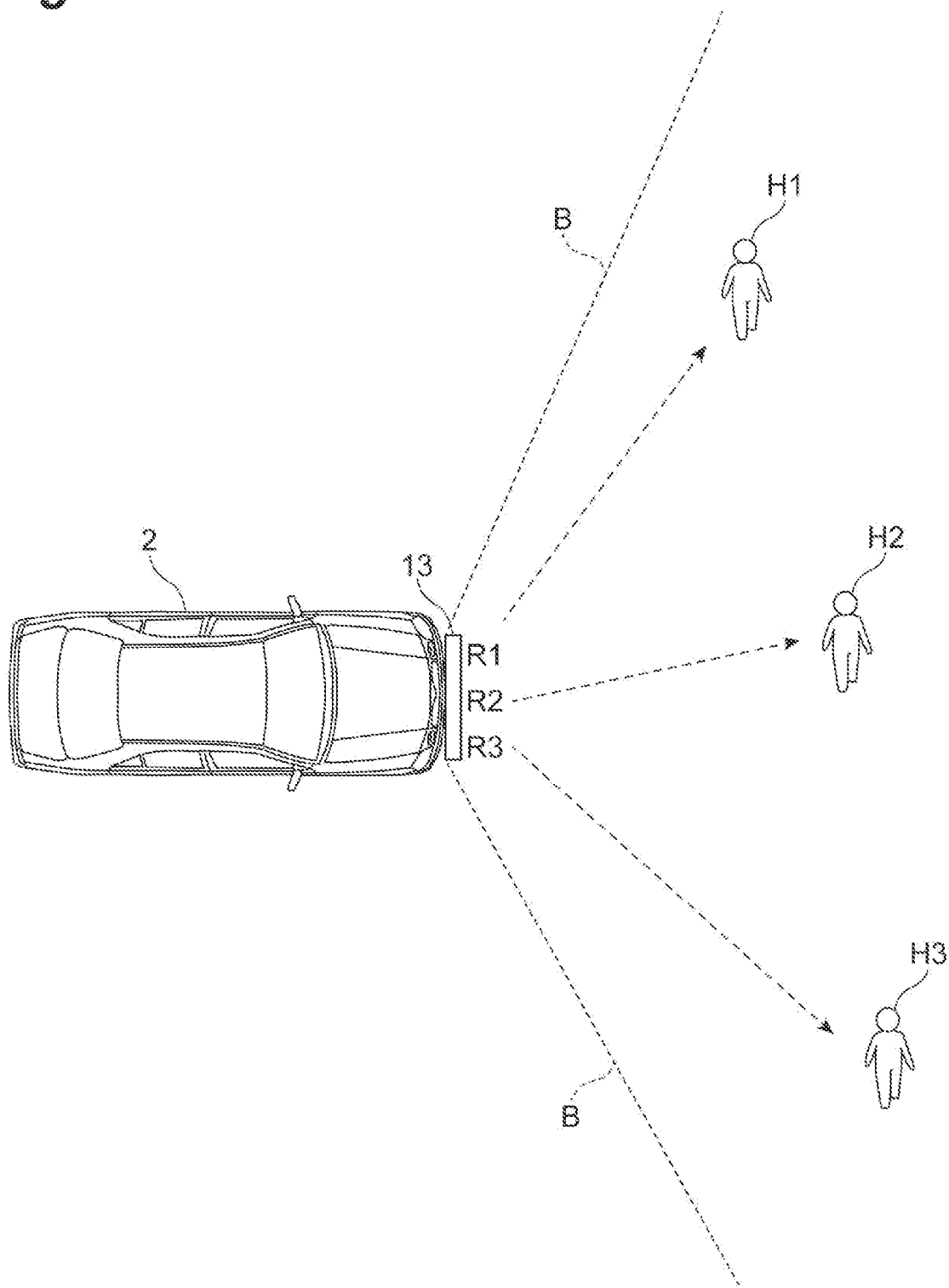
FIG. 3 is a view illustrating an example of notification with respect to a plurality of pedestrians.

FIG. 3 is a view illustrating an example of notification with respect to a plurality of pedestrians. As shown in FIG. 3, a front surface of the vehicle 2 is provided with the notification unit 13. The notification unit 13 is a display device. The plurality of pedestrians is present in front of the vehicle 2 while being present inside a notification area (area defined by notification region boundary lines B) of the notification unit 13. Here, three pedestrians, who are first pedestrian H1, a second pedestrian H2, and a third pedestrian H3, are present. The notification controller 12 causes the notification unit 13 to perform notification about the information for all the pedestrians at once. That is, the notification controller 12 can cause the notification to be performed such that the information for all the pedestrians is arranged on one display screen. The notification controller 12 controls the notification unit 13 such that the number of display regions in the display screen corresponds to the number of pedestrians.

In the example shown in FIG. 3, the notification controller 12 controls the notification unit 13 such that three display regions are provided in accordance with the three pedestrians. The notification controller 12 associates a plurality of display regions with a plurality of pedestrians. In the example shown in FIG. 3, the notification controller 12 associates a first display region R1, which is a display region that is most easily visually recognized from the first pedestrian H1 side, with the first pedestrian H1. The display region that is most easily visually recognized from the first pedestrian H1 side is a display region that is shortest among the plurality of display regions in distance to the first pedestrian H1, for example. The meaning of "to associate" is "to correlate". Specifically, the notification controller 12 correlates the first pedestrian H1 and the first display region R1 with each other in data by using a data table or the like. Accordingly, the notification controller 12 can generate information based on the result of recognition of the first pedestrian H1 and to specify a display region on which the information generated for the first pedestrian H1 is displayed by referring to the data table. In the same manner, the notification controller 12 associates the second display region R2 with the second pedestrian H2 and associates the third display region R3 with the third pedestrian H3. In this manner, the notification controller 12 causes the notification unit 13 to display information to a corresponding pedestrian for each display region.

The notification controller 12 may determine an upper limit value for the number of display regions in advance. The notification controller 12 causes one display region to display information for one person. Therefore, when the number of pedestrians is equal to or greater than the upper limit value, the notification controller 12 selects pedestrians of which the number is the same as the upper limit value and causes the notification unit 13 not to perform notification about information related to other pedestrians. For example, the notification controller 12 may assign a priority for each pedestrian, select notification targets from high-priority pedestrians, and finish the selection when the total number of selected persons is the same as the upper limit value. The notification controller 12 ranks a plurality of pedestrians such that the shorter the distance between a pedestrian and the vehicle 2 is, the higher the priority of the pedestrian is. The notification controller 12 may rank pedestrians who are separated from the vehicle 2 by a distance equal to or smaller than a predetermined threshold distance. In this case, it is possible to exclude pedestrians who are separated from the vehicle 2 by a distance larger than the predetermined threshold distance from targets to be ranked and thus it is possible to realize high-speed processing.

Figure 4:
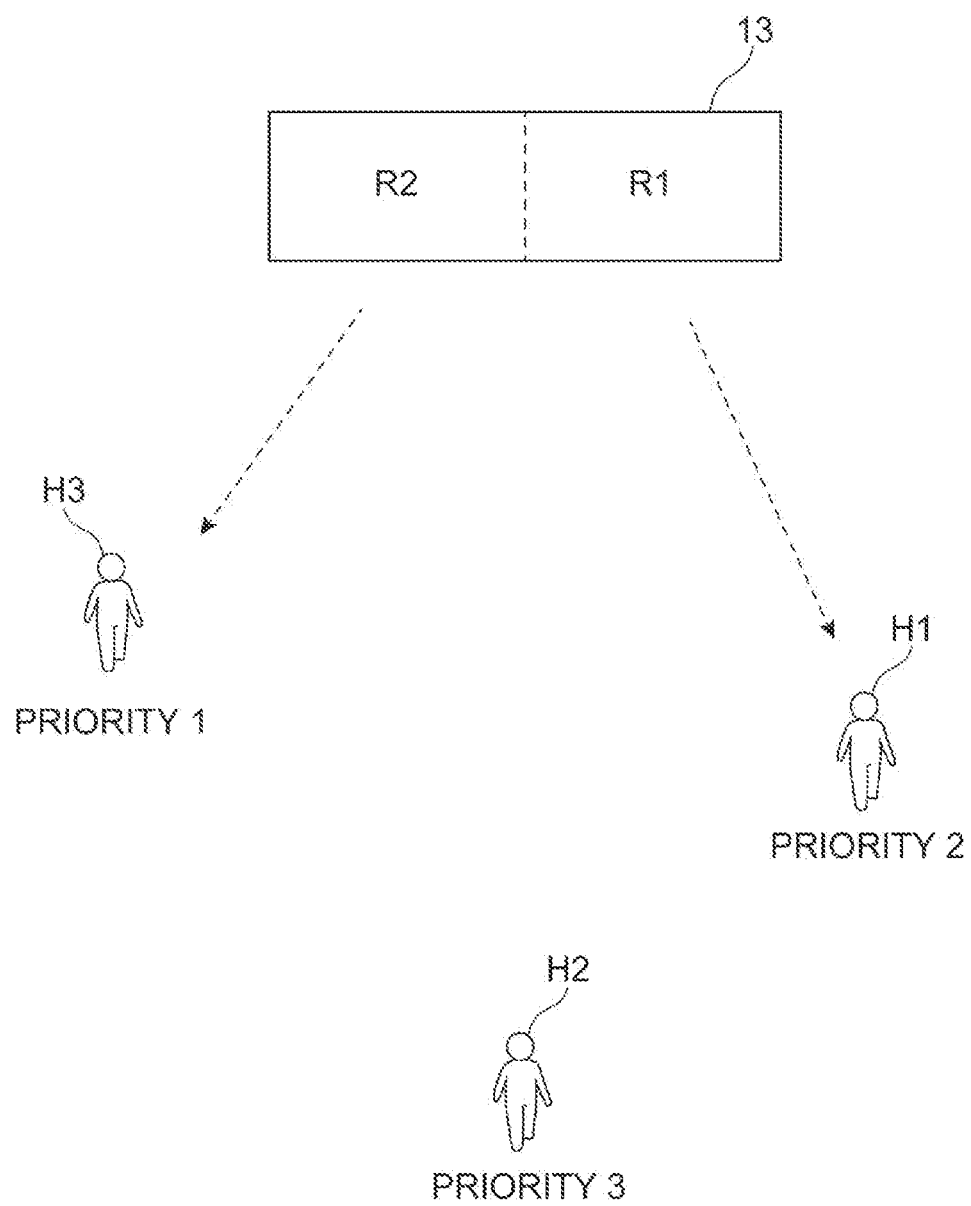
FIG. 4 is a view illustrating an example of notification performed in accordance with priorities.

FIG. 4 is a view illustrating an example of notification performed in accordance with priorities. In the example shown in FIG. 4, the number of display regions of the notification unit 13 has been limited to two by the notification controller 12. Three pedestrians are present in the vicinity of the vehicle 2 and priorities have been assigned thereto. The smaller a number given to a priority is, the higher the priority is. Specifically, a priority "2" has been assigned to the first pedestrian H1, a priority "3" has been assigned to the second pedestrian H2, and a priority "1" has been assigned to the third pedestrian H3. In this case, the notification controller 12 selects the third pedestrian H3 and the first pedestrian H1 as notification targets in accordance with the assigned priorities and excludes the second pedestrian H2 from the notification targets. Then, the notification controller 12 associates the first display region R1 with the first pedestrian H1 and causes information related to the first pedestrian H1 to be displayed on the first display region R1. In the same manner, the notification controller 12 associates the second display region R2 with the third pedestrian H3 and causes information related to the third pedestrian H3 to be displayed on the second display region R2. As described above, the notification controller 12 can choose information to be displayed and can perform appropriate notification with respect to a plurality of pedestrians with a limited number of display regions.

Operation of Notification Device

Figure 5:
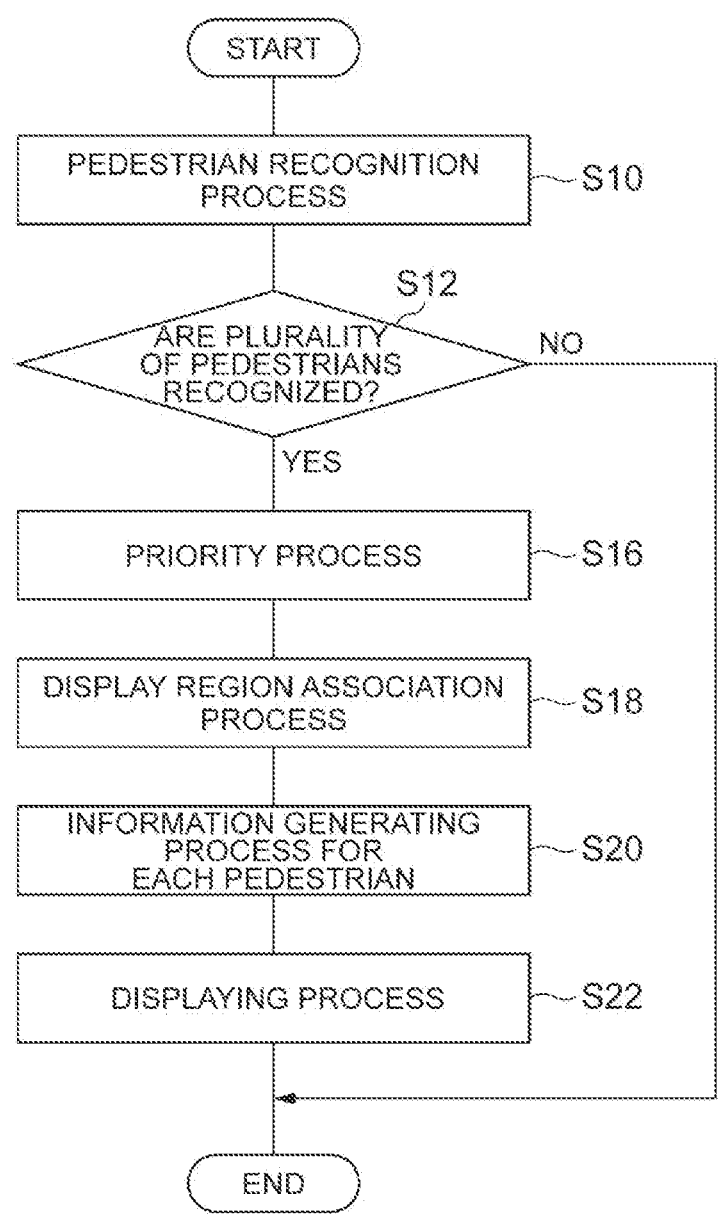
FIG. 5 is a flowchart illustrating an example of the operation of the notification device.

FIG. 5 is a flowchart illustrating an example of the operation of the notification device. A process as in the flowchart shown in FIG. 5 is performed by the notification ECU 10 of the notification device 1. The notification ECU 10 starts the process when a notification start button is turned ON due to an operation of a driver or the like.

As illustrated in FIG. 5 the recognition unit 11 of the notification ECU 10 recognizes whether objects in front of the vehicle 2 that are detected by the external sensor 3 are a plurality of pedestrians or not, as a pedestrian recognition process (S10). When the detected objects are a plurality of pedestrians, the recognition unit 11 recognizes the positions of the plurality of pedestrians. At this time, the recognition unit 11 may recognize a direction in which a pedestrian proceeds based on a temporal change of the position of the pedestrian and may exclude the pedestrian from the plurality of pedestrians when the pedestrian is a pedestrian who moves in the same direction as the vehicle 2 at a position outside a roadway on which the vehicle 2 travels.

Then, the notification controller 12 of the notification ECU 10 determines whether there is a plurality of pedestrians recognized in the pedestrian recognition process (S10), as a multi-pedestrian determination process (S12). When the notification controller 12 determines that there is a plurality of pedestrians recognized in the pedestrian recognition process (S12:YES), the notification ECU 10 performs a priority process (S16).

The notification controller 12 gives priorities to the plurality of pedestrians recognized in the pedestrian recognition process (S10), as the priority process (S16). The notification controller 12 ranks the plurality of pedestrians such that the shorter the distance between a pedestrian and the vehicle 2 is, the higher the priority of the pedestrian is. Then, the notification controller 12 selects pedestrians, of which the number corresponds to the number of display regions set in advance, in order of priority.

Next, the notification controller 12 associates the plurality of pedestrians selected in the priority process (S16) with the display regions, as a display region association process (S18). The notification controller 12 correlates the pedestrians and the display regions with each other in a data table.

Next, the notification controller 12 generates information for each pedestrian as an information generating process for each pedestrian (S20). The notification controller 12 generates object information indicating the result of recognition for each pedestrian.

Next, the notification controller 12 causes the notification unit 13 to display information that is generated in the information generating process for each pedestrian (S20), as a displaying process (S22). The notification controller 12 causes the information for each pedestrian to be displayed on a corresponding display region. When the displaying process (S22) is finished or when the notification controller 12 determines that there is no plurality of pedestrians recognized (S12:NO), the process as in the flowchart shown in FIG. 5 is terminated. When the process as in the flowchart shown in FIG. 5 is terminated and a termination condition is not satisfied, the process as in the flowchart shown in FIG. 5 is started from the beginning. The termination condition is that a notification termination button is turned ON due to an operation of the driver, for example.

In the case of the notification device 1 as described above, when the external sensor 3 detects a plurality of pedestrians, information for each pedestrian is generated and notification about the generated information for each pedestrian is performed. For this reason, in comparison with a case where all of the plurality of the pedestrians is notified of uniform information, it is possible to perform notification of which the contents match an action taken by each pedestrian. For this reason, with the notification device 1, it is possible to perform notification without confusing the plurality of pedestrians in comparison with a case where all of the plurality of the pedestrians is notified of uniform information.

In addition, the notification unit 13 is provided with a plurality of display regions with which information is displayed to the outside of the vehicle and the notification controller 12 associates the plurality of display regions with a plurality of pedestrians and causes information to be displayed on each of the associated display regions. For this reason, the notification device 1 also can perform notification about an association relationship between information about which notification is performed and a notification target pedestrian.

Second Embodiment

A notification according to a second embodiment is the same as the notification device 1 according to the first embodiment except for a point that a plurality of pedestrians is grouped and notification is performed for each group. Hereinafter, description will be made focusing on a difference between the first embodiment and the second embodiment and repetitive description will be omitted.

Configuration of Vehicle and Notification Device

The configuration of the notification device according to the second embodiment is the same as that of the notification device 1 according to the first embodiment except for a point that the functions of the notification controller 12 are partially different from those in the first embodiment. A vehicle in which the notification device according to the second embodiment is the same as the vehicle 2 in which the notification device 1 according to the first embodiment is installed.

In response to recognizing the plurality of pedestrians by the recognition unit 11, the notification controller 12 groups the pedestrians into at least one group based on pedestrian-to-pedestrian distances of the plurality of pedestrians. When a distance between pedestrians is equal to or smaller than a predetermined distance, the notification controller 12 determines that the pedestrians belong to the same group. The notification controller 12 may form one group with a plurality of persons or form a group with one person.

The notification controller 12 may group the pedestrians based on another factor in addition to the pedestrian-to-pedestrian distances. For example, the notification controller 12 may group the pedestrians into at least one group based on the pedestrian-to-pedestrian distances of the plurality of pedestrians and at least one of the speed, the body orientation, and the proceeding direction of each of the plurality of pedestrians.

The notification controller 12 may determine that a first pedestrian and a second pedestrian belong to the same group when a distance between the first pedestrian and the second pedestrian is equal to or smaller than a predetermined distance and a difference between the speed of the first pedestrian and the speed of the second pedestrian is equal to or smaller than a predetermined speed. Alternatively, the notification controller 12 may determine that the first pedestrian and the second pedestrian belong to the same group when the distance between the first pedestrian and the second pedestrian is equal to or smaller than the predetermined distance and a direction in which the body of the first pedestrian faces and a direction in which the body of the second pedestrian faces are the same direction as each other. Alternatively, the notification controller 12 may determine that the first pedestrian and the second pedestrian belong to the same group when the distance between the first pedestrian and the second pedestrian is equal to or smaller than the predetermined distance and a proceeding direction of the first pedestrian and a proceeding direction of the second pedestrian are the same direction as each other. Alternatively, the notification controller 12 may determine whether the first pedestrian and the second pedestrian belong to the same group or not by using all of the above-described pedestrian-to-pedestrian distances, the speeds, the body orientations, and the proceeding directions.

Figure 6:
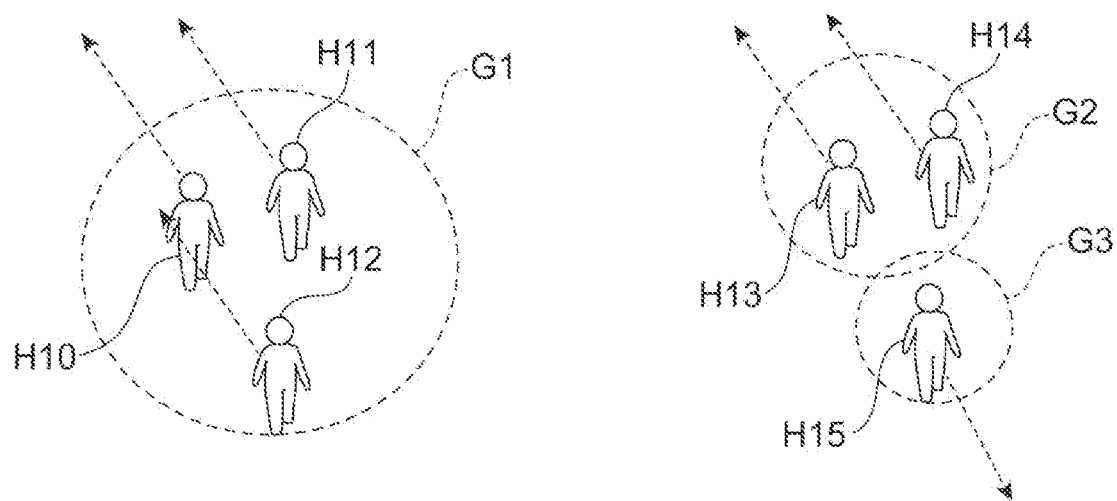
FIG. 6 is a view for describing grouping of the plurality of pedestrians.

FIG. 6 is a view for describing the grouping of the plurality of pedestrians. An example where the grouping of the pedestrians is performed based on a movement direction in addition to the pedestrian-to-pedestrian distances will be described by using FIG. 6. In FIG. 6, pedestrians H10 to H12 satisfy a pedestrian-to-pedestrian distance condition related to the grouping. Similarly, pedestrians H13 to H15 satisfy the pedestrian-to-pedestrian distance condition related to the grouping and a positional relationship therebetween is the same as that of the pedestrians H10 to H12.

Here, the notification controller 12 performs the grouping in consideration of the movement direction also. The pedestrians H10 to H12 shown in FIG. 6 are moving in the same direction represented by arrows. In this case, the notification controller 12 groups the pedestrians H10 to H12 into a first group G1, which is one group, since the pedestrians H10 to H12 are moving integrally. With regard to this, the pedestrians H13 and H14 shown in FIG. 6 are moving in the same direction represented by arrows and the pedestrians H15 are moving in a direction opposite to the movement direction of the pedestrians H13 and H14. In this case, since the movement directions are completely different from each other, the notification controller 12 groups the pedestrians H13 and H14 into a second group G2, which is one group, and groups the pedestrian H15 into a third group G3, which is one group.

As described above, since the pedestrians H13 to H15 who are grouped into one group when determination is performed based on only the pedestrian-to-pedestrian distances are grouped in consideration of the movement directions also, the pedestrians H13 to H15 can be grouped into two groups. Therefore, it is possible to more accurately perform the grouping in comparison with a case where the grouping is performed based on only the pedestrian-to-pedestrian distances. When the grouping is performed in consideration of the speeds or the body orientations, it is also possible to improve the accuracy of the grouping as with a case where the grouping is performed in consideration of the movement directions.

The notification controller 12 generates information, about which the notification unit 13 performs notification, for each group and causes the notification unit 13 to perform notification about the generated information for each group. For example, the notification controller 12 generates, based on the positions and movements of the groups recognized by the recognition unit 11, object information indicating the position and movement of the group for each group. The notification controller 12 causes the notification unit 13 to perform notification about the generated object information. Accordingly, each group is notified of how the groups are recognized by the vehicle 2.

Figure 7:
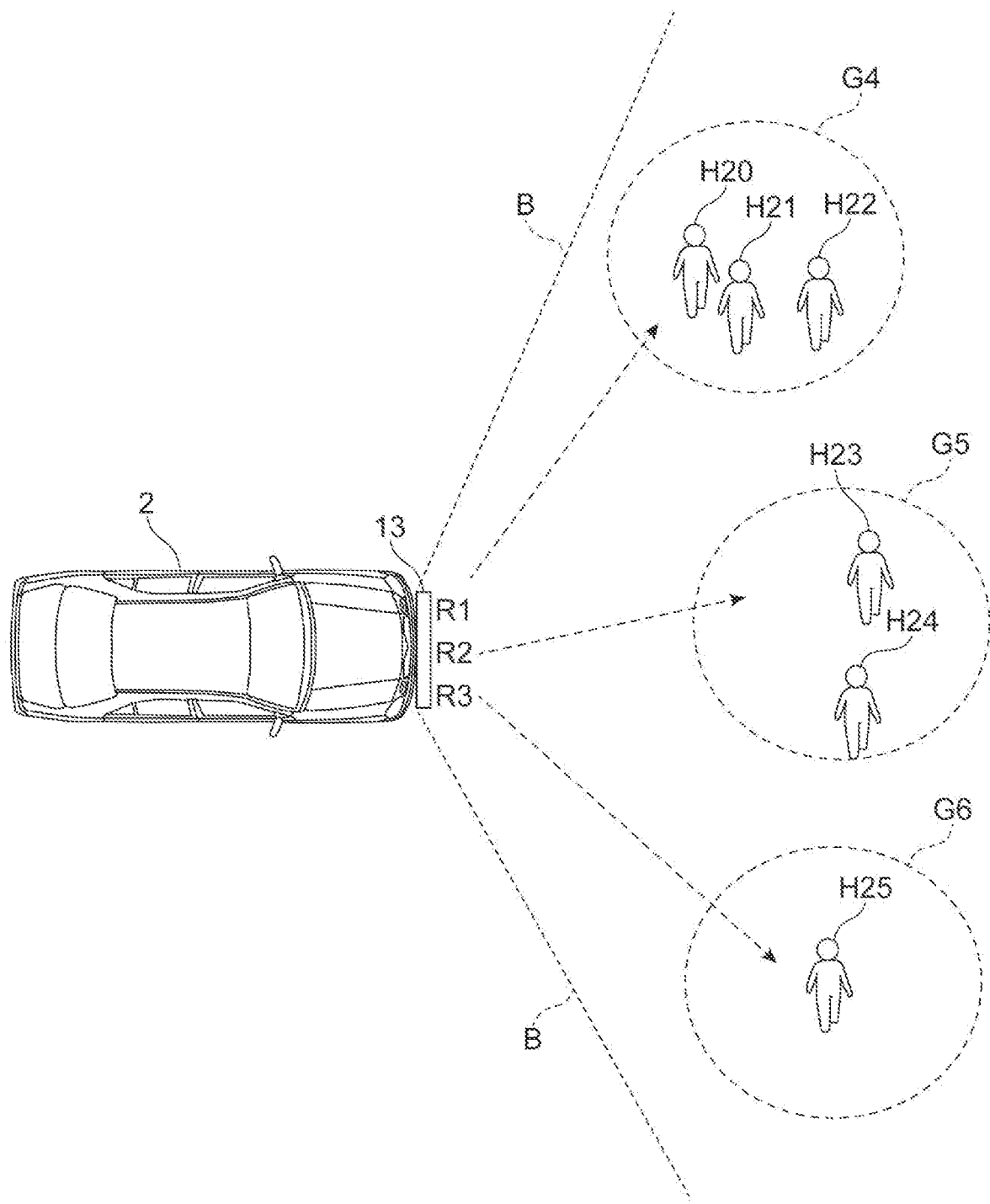
FIG. 7 is a view illustrating an example of notification with respect to the plurality of grouped pedestrians.

FIG. 7 is a view illustrating an example of notification with respect to a plurality of grouped pedestrians. As shown in FIG. 7, a front surface of the vehicle 2 is provided with the notification unit 13. The notification unit 13 is a display device. The plurality of grouped pedestrians is present in front of the vehicle 2 while being present inside the notification area (area defined by notification region boundary lines B) of the notification unit 13. Here, three groups, that are a fourth group G4 (pedestrian H20, pedestrian H21, and pedestrian H22), a fifth group G5 (pedestrian H23 and pedestrian H24), and a sixth group G6 (pedestrian H25), are present. The notification controller 12 causes the notification unit 13 to perform notification about the generated object information for all the groups at once. That is, the notification controller 12 can cause the notification to be performed such that the information for all the groups is arranged on one display screen. The notification controller 12 controls the notification unit 13 such that the number of display regions in the display screen corresponds to the number of groups.

In the example shown in FIG. 7, the notification controller 12 controls the notification unit 13 such that three display regions are provided in accordance with the three groups. The notification controller 12 associates a plurality of display regions with a plurality of groups. In the example shown in FIG. 7, the notification controller 12 associates the first display region R1, which is a display region that is most easily visually recognized from the fourth group G4 side, with the fourth group G4. The display region that is most easily visually recognized from the fourth group G4 side is a display region that is shortest among the plurality of display regions in distance to the fourth group G4, for example. The meaning of "to associate" is "to correlate". Specifically, the notification controller 12 correlates the fourth group G4 and the first display region R1 with each other in data by using a data table or the like. Accordingly, the notification controller 12 can generate information based on the result of recognition of the fourth group G4 and specify a display region on which the information generated for the fourth group G4 is displayed by referring to the data table. In the same manner, the notification controller 12 associates the second display region R2 with the fifth group G5 and associates the third display region R3 with the sixth group G6. In this manner, the notification controller 12 causes the notification unit 13 to display information to a corresponding group for each display region.

The notification controller 12 may determine an upper limit value for the number of display regions in advance. The notification controller 12 causes one display region to display information for one group. Therefore, when the number of groups is equal to or greater than the upper limit value, the notification controller 12 selects groups of which the number is the same as the upper limit value and causes the notification unit 13 not to perform notification about information related to other groups. For example, the notification controller 12 may assign a priority for each group, select notification targets from high-priority groups, and finish the selection when the total number of selected groups is the same as the upper limit value. The notification controller 12 ranks groups such that the shorter the distance between a group and the vehicle 2 is, the higher the priority of the group is. The notification controller 12 may rank groups separated from the vehicle 2 by a distance equal to or smaller than a predetermined threshold distance. In this case, it is possible to exclude groups separated from the vehicle 2 by a distance larger than the predetermined threshold distance from targets to be ranked and thus it is possible to realize high-speed processing.

Figure 8:
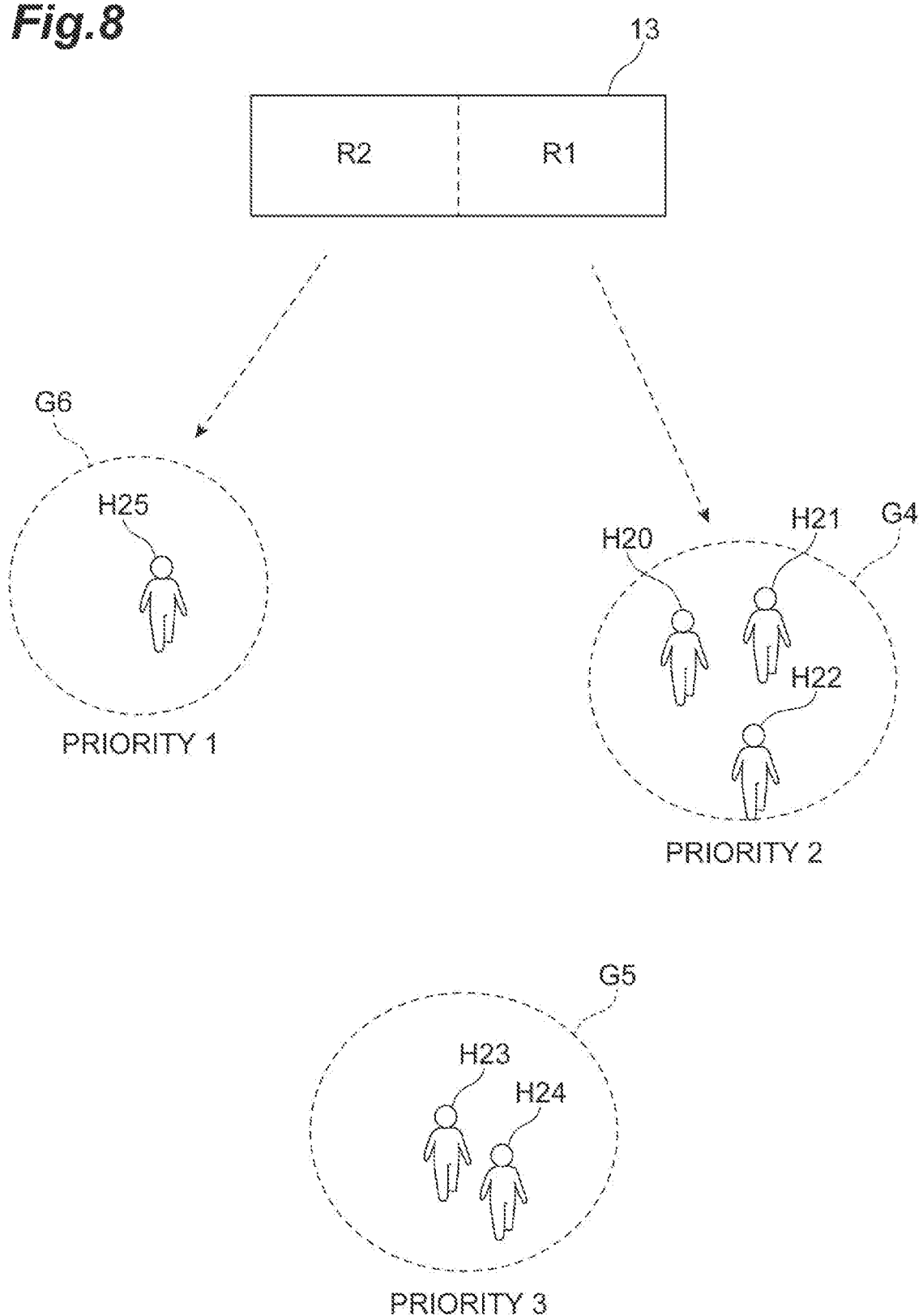
FIG. 8 is a view illustrating an example of notification performed in accordance with priorities.

FIG. 8 is a view illustrating an example of notification performed in accordance with priorities. In the example shown in FIG. 8, the number of display regions of the notification unit 13 has been limited to two by the notification controller 12. Three groups are present in the vicinity of the vehicle 2 and priorities have been assigned thereto. The smaller a number given to a priority is, the higher the priority is. Specifically, a priority "2" has been assigned to the fourth group G4, a priority "3" has been assigned to the fifth group G5, and a priority "1" has been assigned to the sixth group G6. In this case, the notification controller 12 selects the sixth group G6 and the fourth group G4 as notification targets in accordance with the assigned priorities and excludes the fifth group G5 from the notification targets. Then, the notification controller 12 associates the first display region R1 with the fourth group G4 and causes information related to the fourth group G4 to be displayed on the first display region R1. In the same manner, the notification controller 12 associates the second display region R2 with the sixth group G6 and causes information related to the sixth group G6 to be displayed on the second display region R2. As described above, the notification controller 12 can choose information to be displayed and can perform appropriate notification with respect to a plurality of pedestrians with a limited number of display regions.

The notification controller 12 may cause the scales of the groups to be included in the object information as the result of recognition of the groups. For example, the notification controller 12 may cause the notification unit 13 to display an object such that the larger the number of pedestrians constituting a group is, the larger the displayed object is. Alternatively, the notification controller 12 may cause the notification unit 13 to display an object of which the size corresponds to the size of a group which is determined by the number of pedestrians constituting the group and intervals between the pedestrians.

Figure 9:
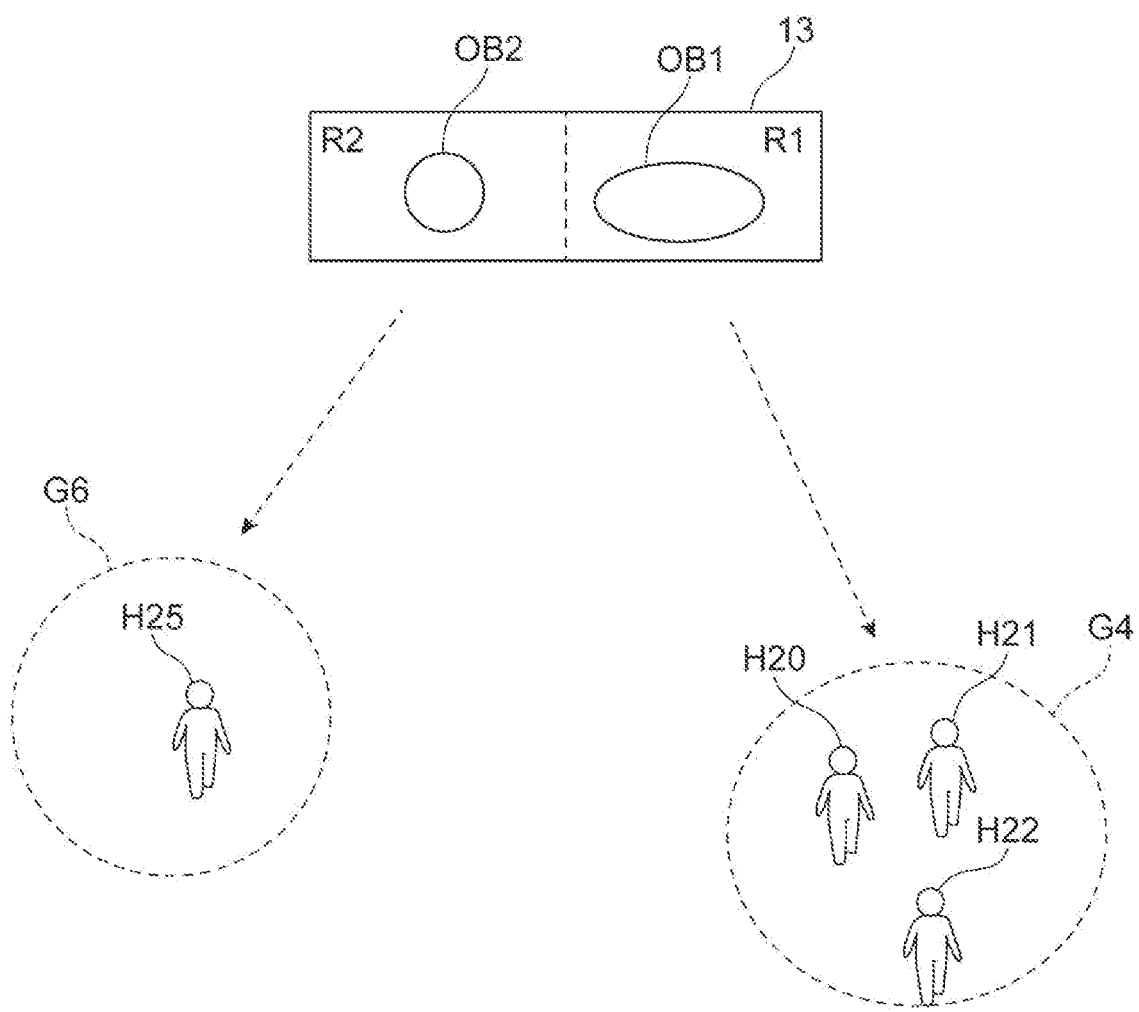
FIG. 9 is a view illustrating an example of notification performed in accordance with the number of pedestrians constituting groups.

FIG. 9 is a view illustrating an example of notification performed in accordance with the number of pedestrians constituting groups. In FIG. 9, the first display region R1 corresponds to the fourth group G4 and the second display region R2 corresponds to the sixth group G6. Three pedestrians H20, H21, and H22 constitute the fourth group G4 and one pedestrian H25 constitutes the sixth group G6. The notification controller 12 causes a first object OB1 indicating a size corresponding to three pedestrians to be displayed on the first display region R1, as the result of recognition related to the fourth group G4. The notification controller 12 causes a second object OB2 indicating a size corresponding to one pedestrian to be displayed on the second display region R2, as the result of recognition related to the sixth group G6. That is, the first object OB1 is displayed to be larger than the second object OB2. By expressing the result of recognition of the groups by means of the sizes of the objects, the pedestrians can be intuitively and visually notified of the degree of recognition of the vehicle 2.

Operation of Notification Device

Figure 10:
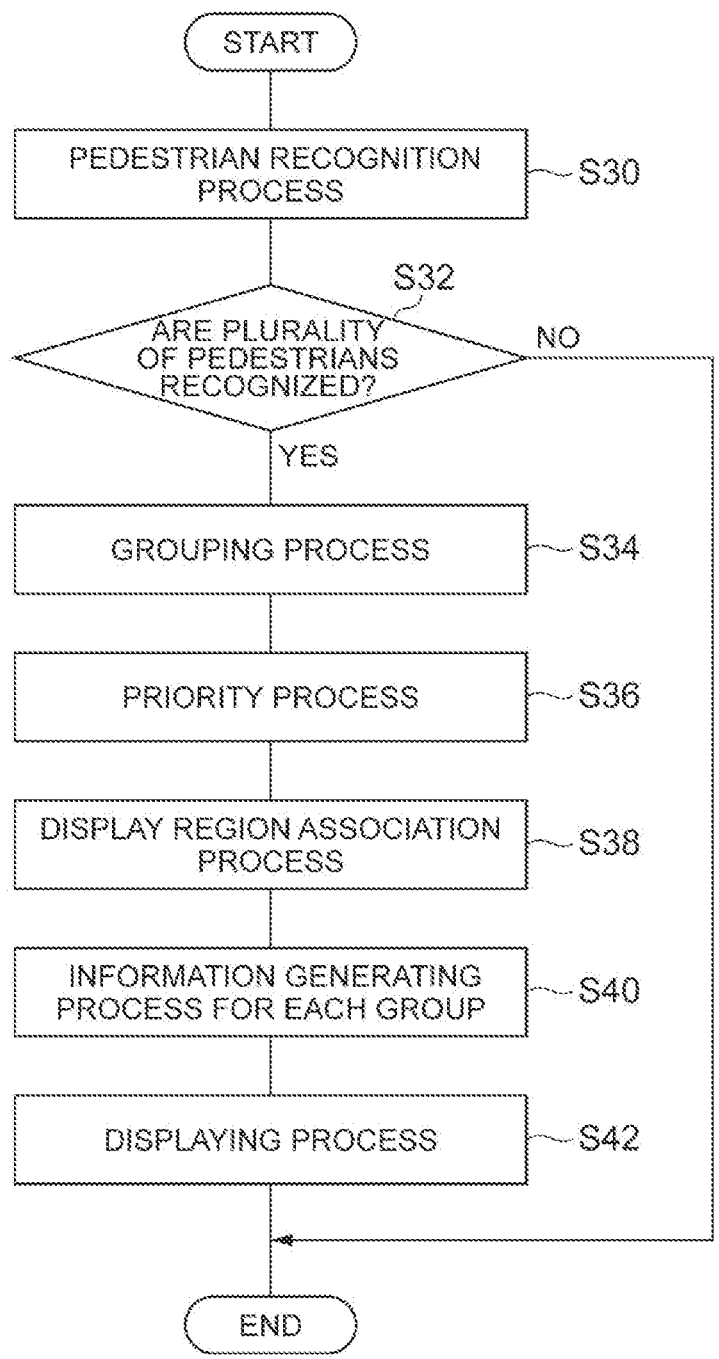
FIG. 10 is a flowchart illustrating an example of the operation of the notification device.

FIG. 10 is a flowchart illustrating an example of the operation of the notification device. A process as in the flowchart shown in FIG. 10 is performed by the notification ECU 10 of the notification device. The notification ECU 10 starts the process when a notification start button is turned ON due to an operation of a driver or the like.

As shown in FIG. 10, the notification ECU 10 starts the process from the pedestrian recognition process (S30). A pedestrian recognition process (S30) and a multi-pedestrian determination process (S32) are the same as the pedestrian recognition process (S10) and a multi-pedestrian determination process (S12) shown in FIG. 5.

When the notification controller 12 determines that there is a plurality of pedestrians recognized (S32:YES), the notification controller 12 of the notification ECU 10 groups the plurality of pedestrians into at least one group based on pedestrian-to-pedestrian distances of the plurality of pedestrians, as a grouping process (S34). The notification controller 12 may group the pedestrians based on another factor in addition to the pedestrian-to-pedestrian distances.

A priority process (S36), a display region association process (S38), a information generating process for each group (S40), and a displaying process (S42) which are performed next are the same as the priority process (S16), the display region association process (S18), the information generating process for each pedestrian (S20), and the displaying process (S22) as shown in FIG. 5 except for a point that a process for each pedestrian is changed to a process for each group. When the displaying process (S42) is finished or when the notification controller 12 determines that there is no plurality of pedestrians recognized (S32:NO), the process as in the flowchart shown in FIG. 10 is terminated. When the process as in the flowchart shown in FIG. 10 is terminated and a termination condition is not satisfied, the process as in the flowchart shown in FIG. 10 is started from the beginning. The termination condition is that a notification termination button is turned ON due to an operation of the driver, for example.

In the case of the notification device according to the second embodiment as described above, when the external sensor 3 detects a plurality of pedestrians, the plurality of pedestrians is grouped based on pedestrian-to-pedestrian distances, information for each group is generated, and notification about the generated information for each group is performed. For this reason, with the notification device, it is possible to perform notification without confusing the plurality of pedestrians in comparison with a case where all of the plurality of the pedestrians is notified of uniform information and it is possible to prevent notification about the same information from being performed a plurality of times in comparison with a case where notification about information for each pedestrian is performed.

In the case of the notification device according to the second embodiment, the grouping is performed in consideration of at least one of a movement direction, a speed, and a body orientation in addition to the pedestrian-to-pedestrian distances and thus it is possible to improve the accuracy of the grouping.

In the case of the notification device according to the second embodiment, the notification unit 13 is provided with a plurality of display regions with which information is displayed to the outside of the vehicle and the notification controller 12 associates the plurality of display regions with the groups and causes information to be displayed on each of the associated display regions. For this reason, the notification device 1 also can perform notification about an association relationship between information about which notification is performed and a notification target group.

Hereinabove, various exemplary embodiments have been described. However, the disclosure is not limited to the above-described exemplary embodiments and various omissions, substitutions, and modifications may be made.

For example, the vehicle 2 is not limited to a vehicle that travels while performing autonomous driving and may be a vehicle that has a function of supporting travel of the driver or a general vehicle that does not have an autonomous driving function or a supporting function.

For example, the notification unit 13 does not need to be provided outside the vehicle 2 and the notification unit 13 may be provided at a position inside the vehicle such as a position inward of the windshield as long as it is possible to perform notification about information with respect to the outside of the vehicle. The notification unit 13 may perform notification about information by using letters. The notification unit 13 is not limited to a display device and may be a light source device such as a lamp. In this case, the notification unit 13 can perform notification about information with the lighting state thereof. Alternatively, the notification unit 13 may be a projector that displays an optical painting on a road surface. In this case, the notification unit 13 can project, onto a road surface, information to be displayed by a display device.

An example where the recognition unit 11 recognizes the positions and movements of pedestrians has been described. However, the positions and movements of pedestrians may be recognized by the notification controller 12 based on the external sensor 3.

The priority process (S16) in FIG. 5 and the priority process (S36) in FIG. 10 may not be performed. In this case, the notification ECU 10 may divide a display region for each detected pedestrian or for each detected group. The display region association process (S18) in FIG. 5 and the display region association process (S38) in FIG. 10 may not be performed. In this case, the notification ECU 10 may display information for each pedestrian or information for each group on the same screen at time intervals. The information generating process for each pedestrian (S20) in FIG. 5 and the information generating process for each pedestrian (S40) in FIG. 10 do not need to be performed in an order as shown in FIGS. 5 and 10 and may be performed in any order as long as the processes are performed during a period between the pedestrian recognition process (S10) and the displaying process (S22) or a period between the pedestrian recognition process (S30) and the displaying process (S42).

What is claimed is:

1. A notification device provided in a vehicle and configured to notify pedestrians of information, the device comprising:
    a recognition unit configured to recognize, based on a result of detection performed by an external sensor, a plurality of pedestrians;
    a notification unit configured to perform notification about the information with respect to an outside of the vehicle, wherein the notification unit is provided with a plurality of display regions each displaying the information to the outside of the vehicle; and
    a notification controller configured to generate the information, about which the notification unit performs notification, for each pedestrian in response to recognizing the plurality of pedestrians by the recognition unit and to cause the notification unit to perform notification about the generated information for each pedestrian.

2. The notification device according to claim 1,
wherein
    the notification controller is configured to associate the plurality of display regions with the plurality of pedestrians and to cause the information to be displayed on each of the associated display regions.

3. The notification device according to claim 1,
wherein the notification controller is configured to control the notification unit to determine a number of the plurality display regions based on a number of the plurality of pedestrians.

4. A notification device provided in a vehicle and configured to notify pedestrians of information, the device comprising:
    a recognition unit configured to recognize, based on a result of detection performed by an external sensor, a plurality of pedestrians;
    a notification unit configured to perform notification about the information with respect to an outside of the vehicle; and
    a notification controller configured to group the plurality of pedestrians into at least one group based on positional relationships of the plurality of pedestrians in response to recognizing the plurality of pedestrians by the recognition unit, to generate the information, about which the notification unit performs notification, for each group, and to cause the notification unit to perform notification about the generated information for each group.

5. The notification device according to claim 4,
wherein the notification controller is configured to group the plurality of pedestrians into at least one group based on the positional relationships of the plurality of pedestrians and at least one of a speed, a body orientation, and a proceeding direction of each of the plurality of pedestrians.

6. The notification device according to claim 4,
wherein the notification unit is provided with a plurality of display regions with which information is displayed to the outside of the vehicle, and
    the notification controller is configured to associate the plurality of display regions with the at least one group and to cause the information to be displayed on each of the associated display regions.

7. The notification device according to claim 4, wherein the positional relationships of the plurality of pedestrians include pedestrian-to-pedestrian distances of the plurality of pedestrians.

8. A method for notifying pedestrians of information using a notification device provided in a vehicle, the method comprising:
    recognizing, by a recognition unit of the notification device, a plurality of pedestrians based on a result of detection performed by an external sensor;

performing, by a notification unit of the notification device, notification about the information with respect to an outside of the vehicle, wherein the notification unit is provided with a plurality of display regions each displaying the information to the outside of the vehicle; and generating the information, about which the notification unit performs notification, for each pedestrian in response to recognizing the plurality of pedestrians by the recognition unit and to cause the notification unit to perform notification about the generated information for each pedestrian.

9. A method for notifying pedestrians of information using a notification device provided in a vehicle, the method comprising:

recognizing, by a recognition unit of the notification device, a plurality of pedestrians based on a result of detection performed by an external sensor;

grouping the plurality of pedestrians into at least one group based on positional relationships of the plurality of pedestrians in response to recognizing the plurality of pedestrians by the recognition unit;

generating the information, about which the notification unit performs notification, for each group; and performing notification about the generated information for each group.

* * * * *